United States Patent
Tanaka

(10) Patent No.: US 8,154,652 B2
(45) Date of Patent: Apr. 10, 2012

(54) LENS APPARATUS AND SHOOTING APPARATUS USING SAME

(75) Inventor: Isao Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 636 days.

(21) Appl. No.: 12/295,701

(22) PCT Filed: Oct. 24, 2007

(86) PCT No.: PCT/JP2007/071168
§ 371 (c)(1), (2), (4) Date: Oct. 1, 2008

(87) PCT Pub. No.: WO2008/152754
PCT Pub. Date: Dec. 18, 2008

(65) Prior Publication Data
US 2010/0053422 A1    Mar. 4, 2010

(30) Foreign Application Priority Data

Jun. 15, 2007  (JP) ................................. 2007-158334

(51) Int. Cl.
| H04N 5/225 | (2006.01) |
| H04N 5/232 | (2006.01) |
| H04N 5/262 | (2006.01) |
| G03B 13/00 | (2006.01) |
| G02B 15/14 | (2006.01) |
| G02B 26/08 | (2006.01) |
| G02B 26/10 | (2006.01) |
| G02B 26/12 | (2006.01) |

(52) U.S. Cl. .................. 348/373; 348/345; 348/240.99; 348/240.3; 348/211.99; 359/694; 359/201.1; 359/696

(58) Field of Classification Search .................. 348/373, 348/361; 356/139.06
See application file for complete search history.

(56) References Cited

U.S. PATENT DOCUMENTS 5,471,296 A * 11/1995 Parker et al. ............. 356/139.06
(Continued)

FOREIGN PATENT DOCUMENTS

EP    1587309    * 10/2005
(Continued)

OTHER PUBLICATIONS

Dec. 30, 2009 International Preliminary Report on Patentability in International Patent Appln. No. PCT/JP2007/071168.

*Primary Examiner* — Jason Chan
*Assistant Examiner* — Stephen Coleman
(74) *Attorney, Agent, or Firm* — Fitzpatrick, Cella, Harper & Scinto

(57) ABSTRACT

A lens apparatus can be easily set even in cases where the lens body and demands are distant from each other upon shooting without a decrease in reliability. A lens body mounted on a camera body is provided with a command signal converting unit, a time-series position signal converting unit, a wireless communication unit, a communication condition monitoring unit and a communication process switch unit. A signal converting unit, to which a zoom demand and a focus demand are connected, is provided with a time-series command signal converting unit, a position signal converting unit and a wireless communication unit. The lens body and the signal converting unit are configured to wirelessly communicate with each other to eliminate the use of connection cables, thereby improving operationality while enabling highly reliable wireless communication.

4 Claims, 17 Drawing Sheets

U.S. PATENT DOCUMENTS

| | | | | |
|---|---|---|---|---|
| 5,557,443 | A * | 9/1996 | Nakamura et al. | 398/30 |
| 5,570,177 | A * | 10/1996 | Parker et al. | 356/139.06 |
| 5,623,355 | A * | 4/1997 | Olsen | 398/162 |
| 6,833,860 | B1 * | 12/2004 | Date | 348/207.1 |
| 7,116,861 | B2 * | 10/2006 | Welch et al. | 385/24 |
| 7,145,737 | B2 | 12/2006 | Tanaka | 359/819 |
| 7,623,783 | B2 * | 11/2009 | Morris et al. | 398/25 |
| 2004/0117174 | A1 * | 6/2004 | Maeda et al. | 704/201 |
| 2005/0049000 | A1 * | 3/2005 | Sheynman et al. | 455/552.1 |
| 2005/0071733 | A1 * | 3/2005 | Fukae et al. | 714/776 |
| 2005/0183132 | A1 * | 8/2005 | McLeod | 725/115 |
| 2005/0225874 | A1 * | 10/2005 | Tanaka | 359/684 |
| 2006/0012700 | A1 * | 1/2006 | Tanaka | 348/335 |
| 2006/0116079 | A1 * | 6/2006 | Fukushima | 455/62 |
| 2007/0109418 | A1 | 5/2007 | Idemura | 348/211.99 |
| 2007/0122148 | A1 * | 5/2007 | Welch et al. | 398/27 |
| 2007/0136587 | A1 * | 6/2007 | Shvodian et al. | 713/169 |
| 2007/0152992 | A1 * | 7/2007 | Kohda et al. | 345/204 |
| 2007/0161404 | A1 * | 7/2007 | Yasujima et al. | 455/557 |
| 2008/0305743 | A1 * | 12/2008 | Aithal et al. | 455/67.11 |

FOREIGN PATENT DOCUMENTS

| | | |
|---|---|---|
| JP | 9-68640 | 3/1997 |
| JP | 2005-328496 | 11/2005 |
| JP | 2007-104300 | 4/2007 |
| JP | 2007-142880 | 6/2007 |

* cited by examiner

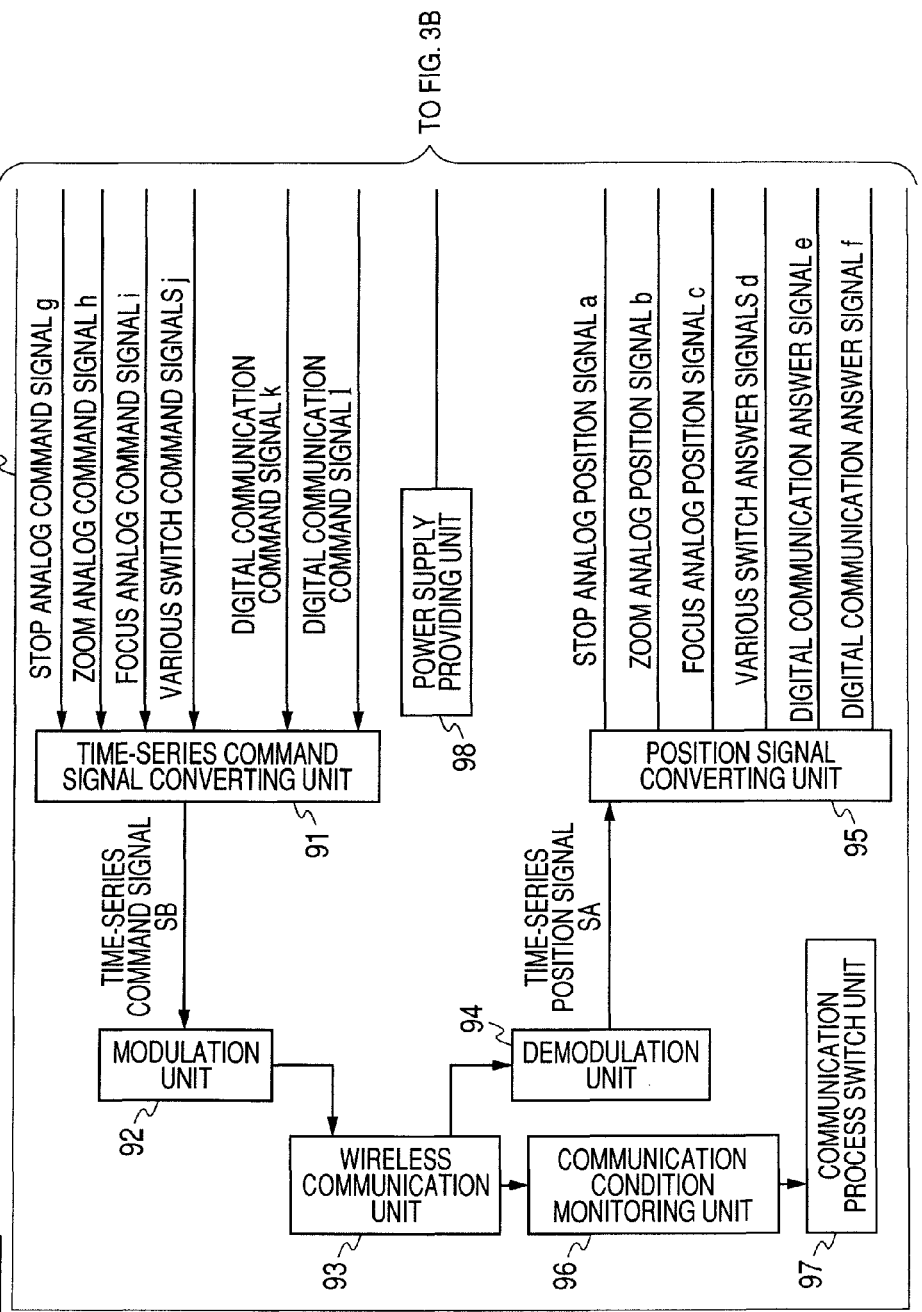

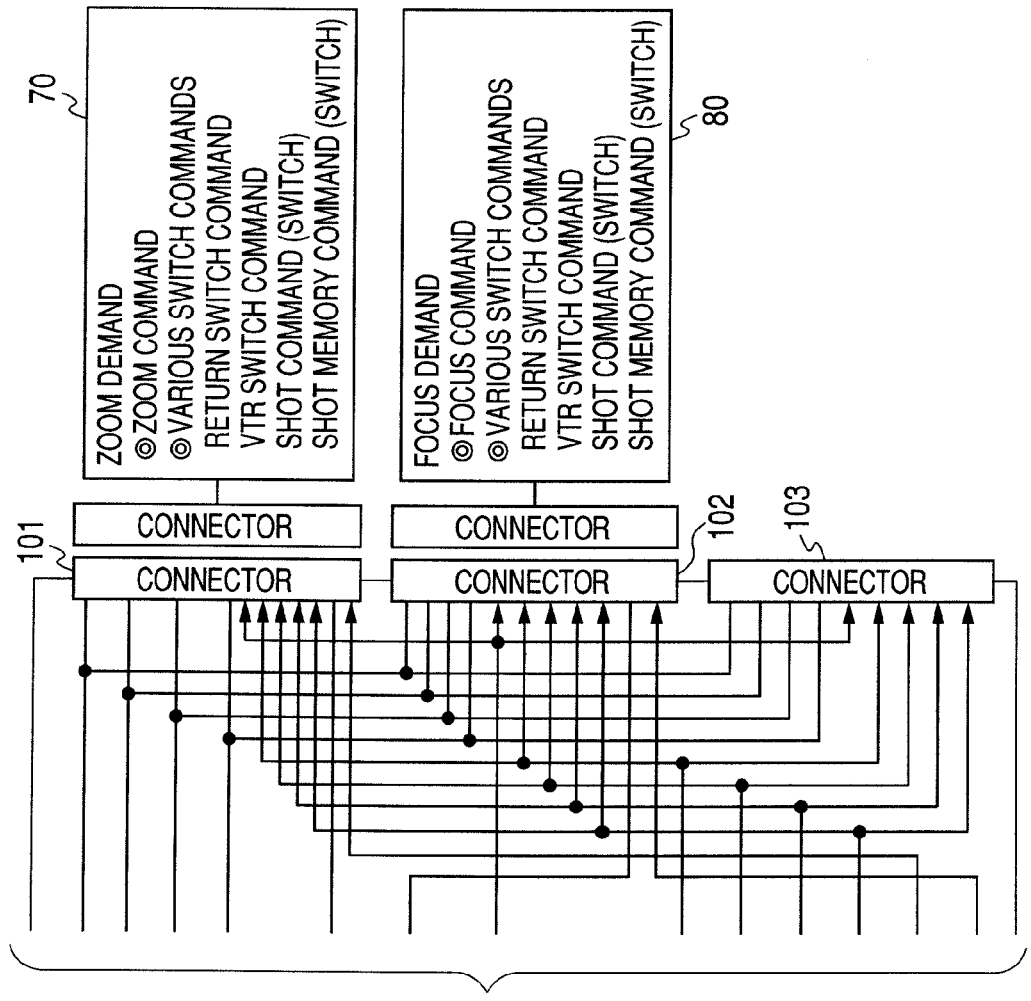

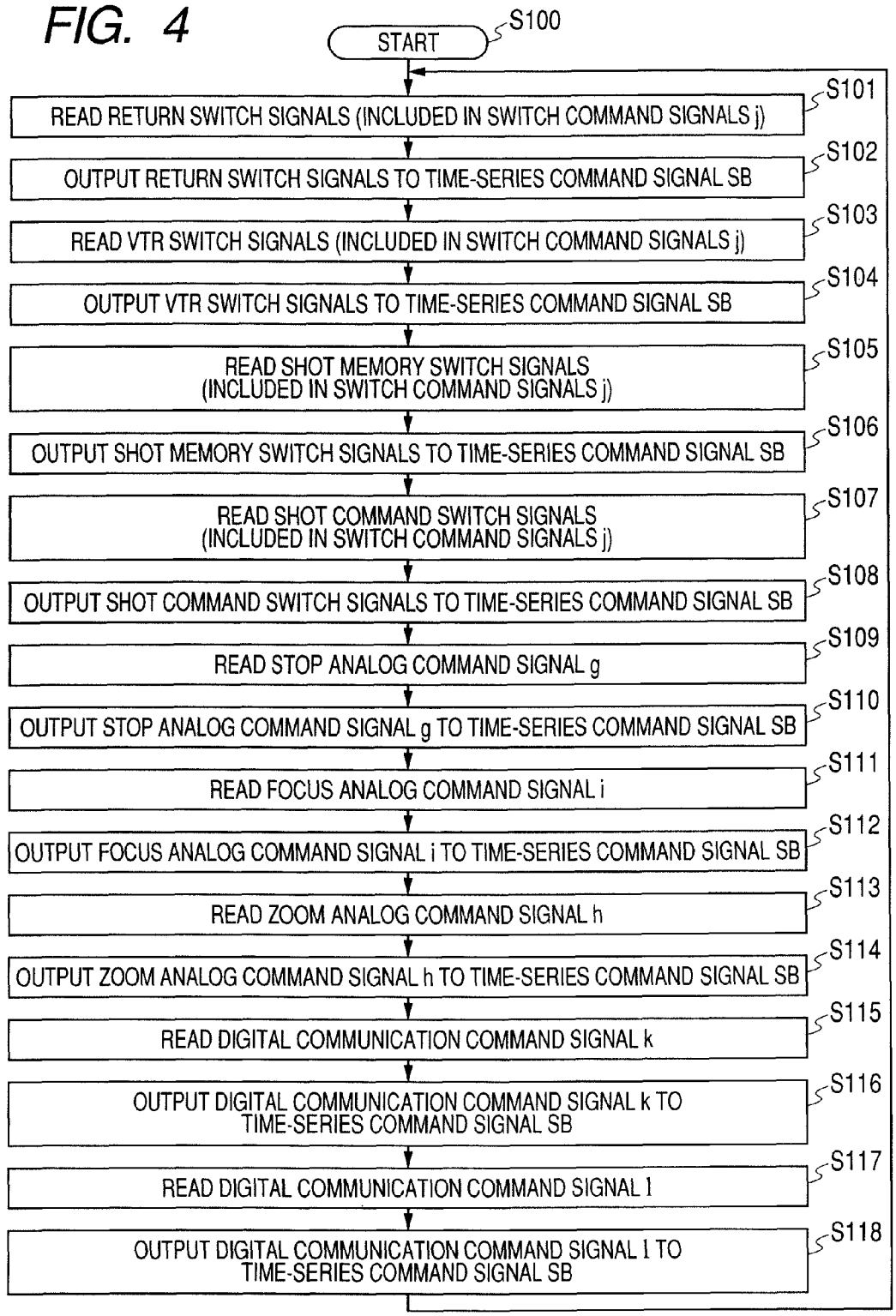

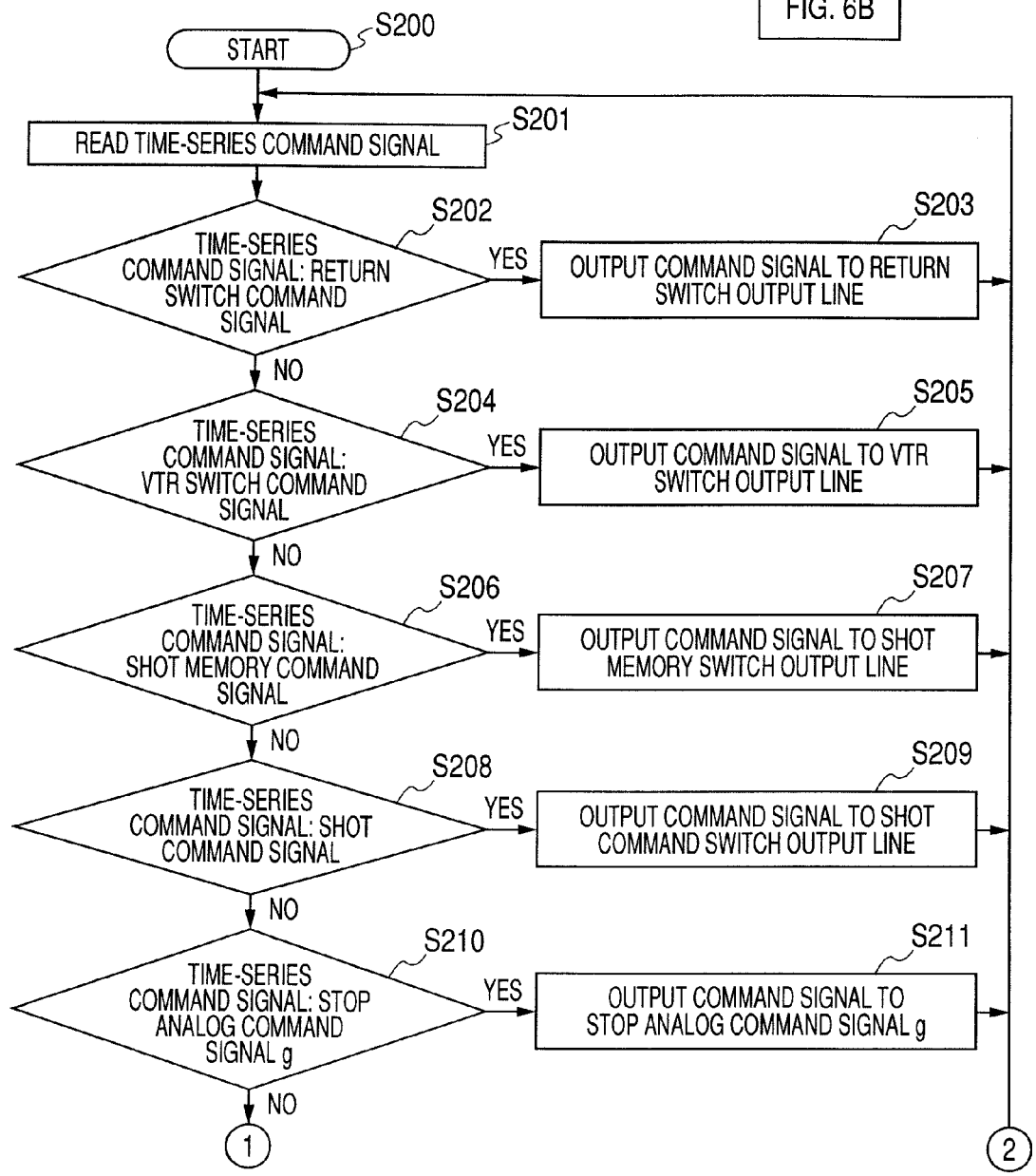

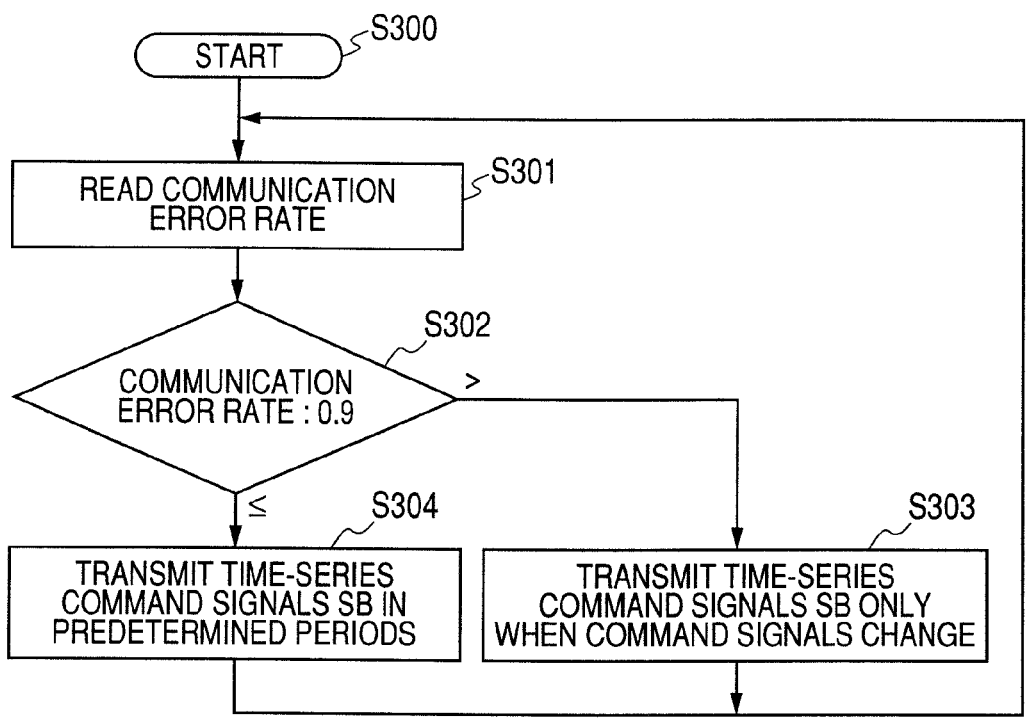
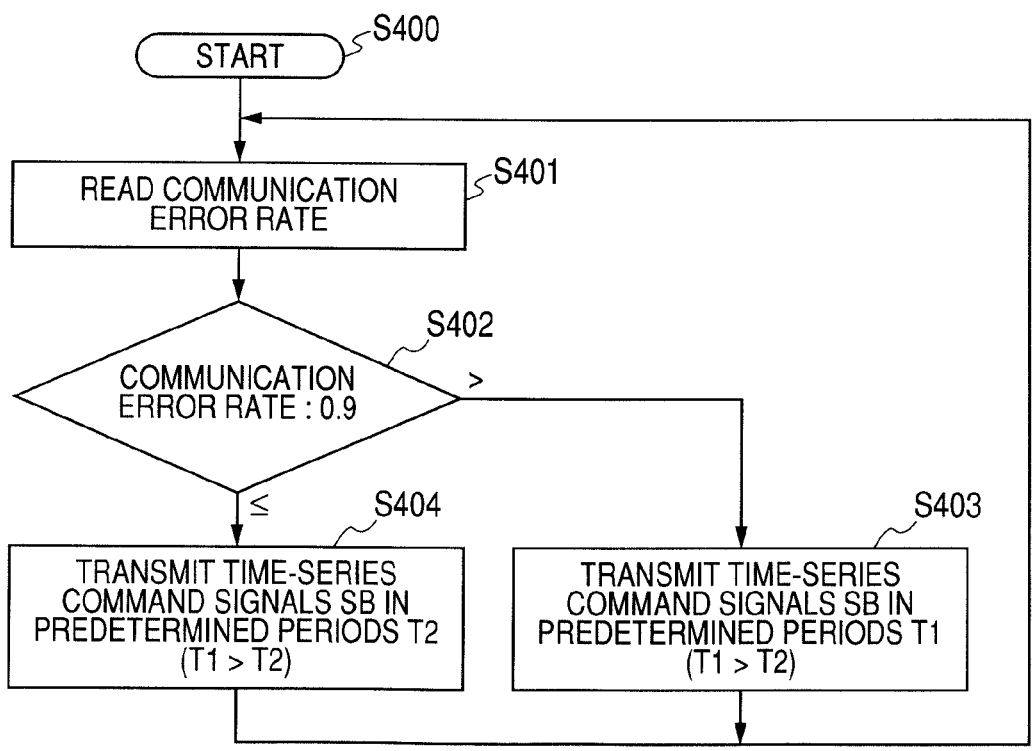

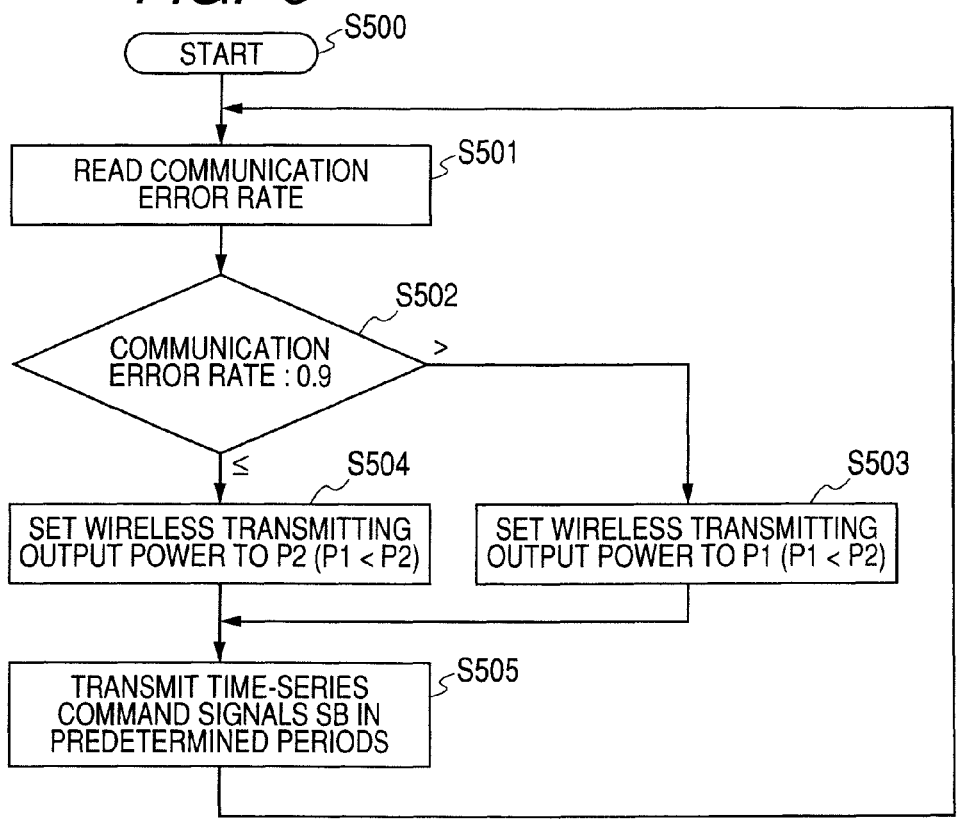
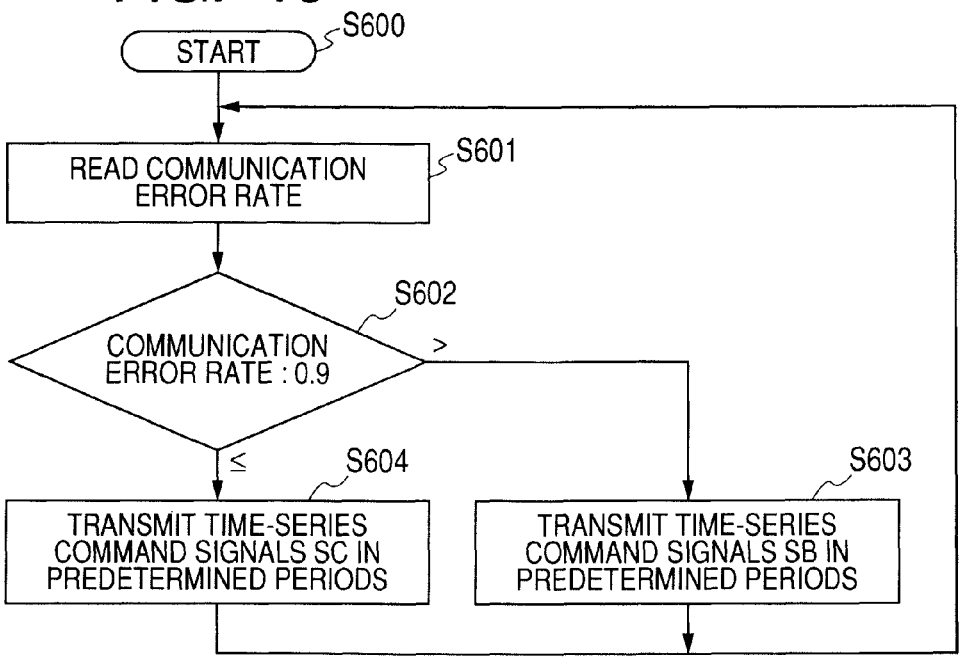

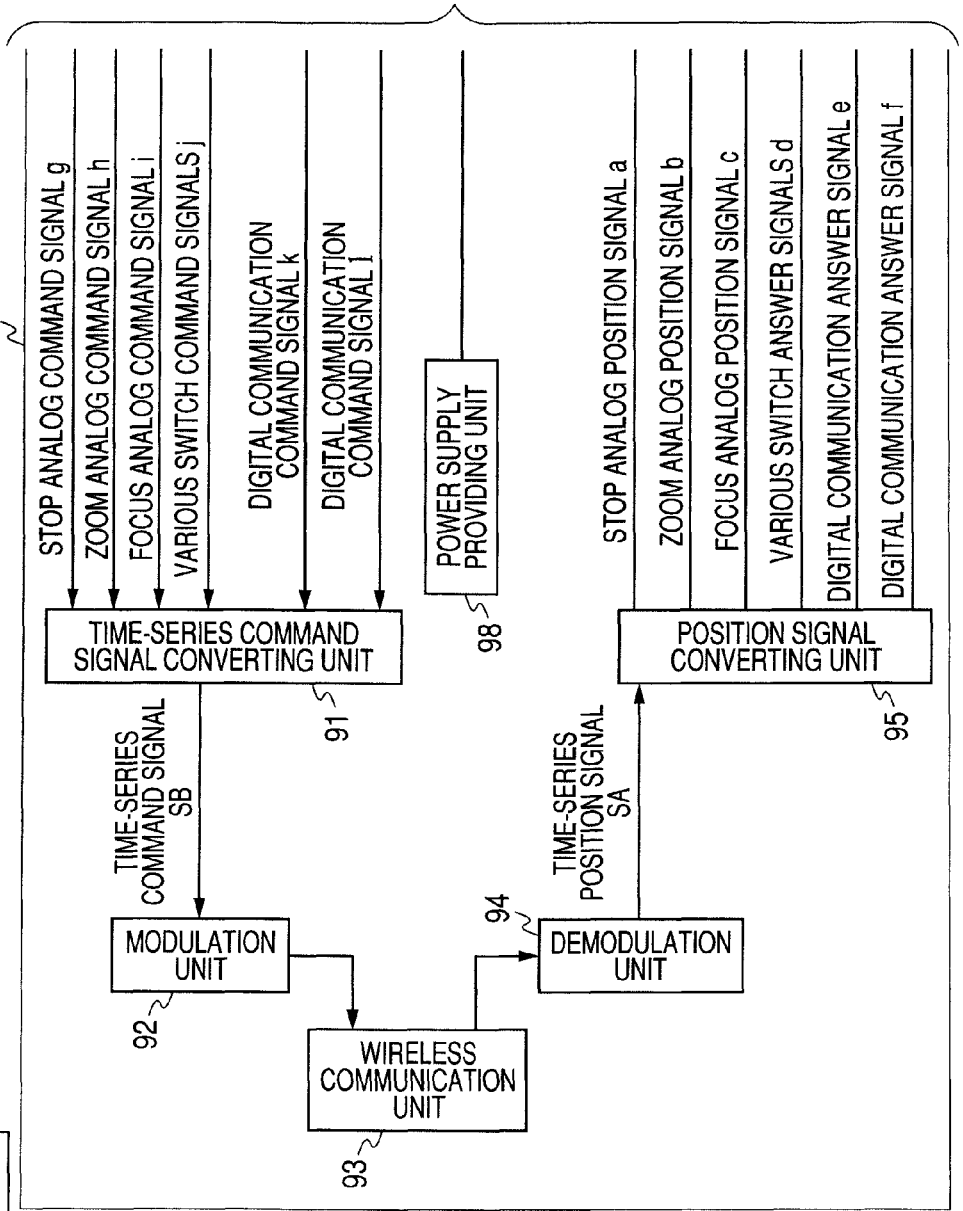

LENS APPARATUS AND SHOOTING APPARATUS USING SAME

TECHNICAL FIELD

The present invention relates to a lens apparatus for use as, for example, a broadcast television camera lens for driving and controlling movable optical members such as a zoom lens, a focusing lens and a stop using a plurality of command units.

BACKGROUND ART

Japanese Patent Application Laid-Open No. 2005-328496 and Japanese Patent Application Laid-Open No. H09-068640 disclose prior art control systems for movable optical members related to zooming and focusing etc. in a television camera lens.

In these systems, a zoom demand serving as a command unit that outputs a command signal for zooming drive and a focus demand serving as a command unit that outputs a command signal for focusing drive are connected to a lens body.

A plurality of command units including a unit that outputs a stop command and a unit for controlling an image stabilizing optical system etc. can also be connected to the lens body in addition to the above-mentioned units.

Connection between the lens body and the command unit is established by cable connection using a connector. The connector disclosed in Japanese Patent Application Laid-Open No. 2005-328496 has a 20-pin configuration, and the cable used between the lens body and the command unit includes twenty (which is the same as the number of the pins of the connector) wires.

As disclosed in Japanese Patent Application Laid-Open No. H09-068640, the cable that is commonly prepared for use between the lens body and the command unit generally has a length of about 1 meter to allow operation of the command unit in the neighborhood of the lens body.

In shooting in a studio or the like, the television camera, television camera lens, zoom demand and focus demand are operated in a state in which they are mounted on tripods. Such an operation style will be referred to as tripod operation.

Alternatively, the television camera with the television lens combined thereto is shouldered by a camera operator without use of the zoom demand and the focus demand. Such an operation style will be referred to as shoulder operation.

FIG. 14 is a block diagram of a television shooting system according to the above mentioned prior art. A zoom demand 3 for operating the zoom lens of the lens body 2 mounted on the camera body 1 can output a return-switch command, a VTR-switch command, a shot command and a shot memory command in addition to a zoom command for controlling zoom drive.

A focus demand 4 for operating the focusing lens of the lens body 2 can output switch commands similar to those of the zoom demand 3 in addition to a focus command for controlling focus drive.

A commonly prepared cable 5, 6 including about twenty wires and having a length of about 1 meter and a connector 7, 8 are used to connect the lens body 1 and the zoom demand 3 or the focus demand 4.

In the above described prior art system, the lens body 2 and each demand 3, 4 are connected by a multi-conductor cable 5, 6, and if a plurality of command units or demands are to be connected to the lens body 2, the same number of cables as the number of the command units are required.

There are some shooting situations in which a camera with a lens is set at the top of a crane having a length of about 3 to 5 meters and shooting is performed by a camera operator who operates command units at the base of the crane (which may be referred to as crane shooting). There are other shooting situations in which a camera with a lens set in a natural field is operated from a distant place to shoot fierce animals or the like.

In such situations, the common cables for connecting the lens body and the command units are not sufficient in length, and extension cables for such particular purposes need to be prepared and set. Preparation and setting of such cables entails a cost and takes time.

In addition, use and setting of a plurality of long cables each including wires as many as about twenty for a plurality of command units of the same number involves the risk of breakage of the cable upon setting, which disadvantageously decreases reliability.

It has been demanded that the operation style with one television camera and a television lens can be changed according to the shooting situation by quickly switching between the tripod operation and the shoulder operation.

In the case of the tripod operation, the television camera and the television lens are integrally and quickly dismounted from the tripod.

However, the shoulder operation is not enabled unless the cables for connection with the zoom demand and the focus demand are disconnected from the television lens. This prevents quick changing of the operation style.

An object of the present invention is to provide a lens apparatus that can be easily set even in cases where the lens body and command units are distant from each other upon shooting without a decrease in the reliability.

DISCLOSURE OF THE INVENTION

According to one aspect of the invention, a lens apparatus including a lens body having a plurality of movable optical members, a plurality of command units that generate a plurality of command signals for the plurality of movable optical members and a signal converting unit that is connected with the plurality of command units by cables and wirelessly connected with the lens body, characterized in that:

the lens body is provided with drive control unit for detecting the positions of the plurality of movable optical members, generating a plurality of position signals and driving each of the plurality of movable optical members based on the command signals and the position signals, command signal converting unit for converting time-series command signals from the signal converting unit into plurality of original command signals, time-series position signal converting unit for converting the plurality of position signals of the plurality of movable optical members into time-series position signals, and wireless communication unit for wirelessly transmitting the time-series position signals to the signal converting unit; and the signal converting unit is provided with time-series command signal converting unit for converting the plurality of command signals input from the plurality of command units into time-series command signals, position signal converting unit for converting the time-series position signals from the lens body into the plurality of original position signals and outputting them to the plurality of command units, and wireless communication unit for wirelessly transmitting the time-series command signals to the lens body.

According to a further aspect of the invention, in the lens apparatus further has communication condition monitoring unit for monitoring wireless communication condition and communication process switch unit for switching communication process according to the wireless communication condition provided in at least one of the lens body and the signal converting unit.

According to a further aspect of the invention, in the lens apparatus, when a communication error rate, which is indicative of the communication condition and is output from the communication condition monitoring unit, is greater than a predetermined value, the communication process switch unit causes communication to be performed only at times when a command state of the command units changes, and when the communication error rate is equal to or smaller than the predetermined value, the communication process switch unit causes communication to be performed at a regular transmitting/receiving period.

According to a further aspect of the invention, in the lens apparatus, when a communication error rate, which is indicative of the communication condition and is output from the communication condition monitoring unit, is greater than a predetermined value, the communication process switch unit causes communication to be performed at a first transmitting/receiving period, and when the communication error rate is equal to or smaller than the predetermined value, the communication process switch unit causes communication to be performed at a second transmitting/receiving period shorter than the first transmitting/receiving period.

According to a further aspect of the invention, in the lens apparatus, when a communication error rate, which is indicative of the communication condition and is output from the communication condition monitoring unit, is greater than a predetermined value, the communication process switch unit causes communication to be performed at a first wireless transmission power level, and when the communication error rate is equal to or smaller than the predetermined value, the communication process switch unit causes communication to be performed at a second wireless transmission power level higher than the first level.

According to a further aspect of the invention, in the lens apparatus, when a communication error rate, which is indicative of the communication condition and is output from the communication condition monitoring unit, is equal to or smaller than a predetermined value, the communication process switch unit causes communication to be performed with time-series command signals in which the number of times of transmission is determined according to the order of priority of a function switch of the command unit.

According to a further aspect of the invention, there is provided a shooting apparatus comprising the lens apparatus set out in the foregoing and a camera body mounted on the lens body.

According to the lens apparatus of the present invention, the use of cables for connecting the lens apparatus and the command units is eliminated, whereby the risk of cable breakage can be completely eliminated. In addition, ease of setting and operation can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 comprising FIGS. 3A and 3B is a circuit block diagram of a zoom demand, a focus demand and a signal converting unit.

FIG. 4 is a flow chart of a process in time-series command signal converting unit.

FIG. 6 comprising FIGS. 6A and 6B is a flow chart of a process in command signal converting unit.

FIG. 7 is a flow chart of a process in communication process switch unit.

FIG. 8 is a flow chart of a process in communication process switch unit according to a second embodiment.

FIG. 9 is a flow chart of a process in communication process switch unit according to a third embodiment.

FIG. 10 is a flow chart of a process in communication process switch unit according to a fourth embodiment.

FIG. 13 comprising FIGS. 13A and 13B is a circuit block diagram of a zoom demand, a focus demand and a signal converting unit according to the fifth embodiment.

BEST MODE FOR CARRYING OUT THE INVENTION

In the following, the present invention will be described in detail based on embodiments illustrated in FIGS. 1 to 13B.

First Embodiment

Figure 1:
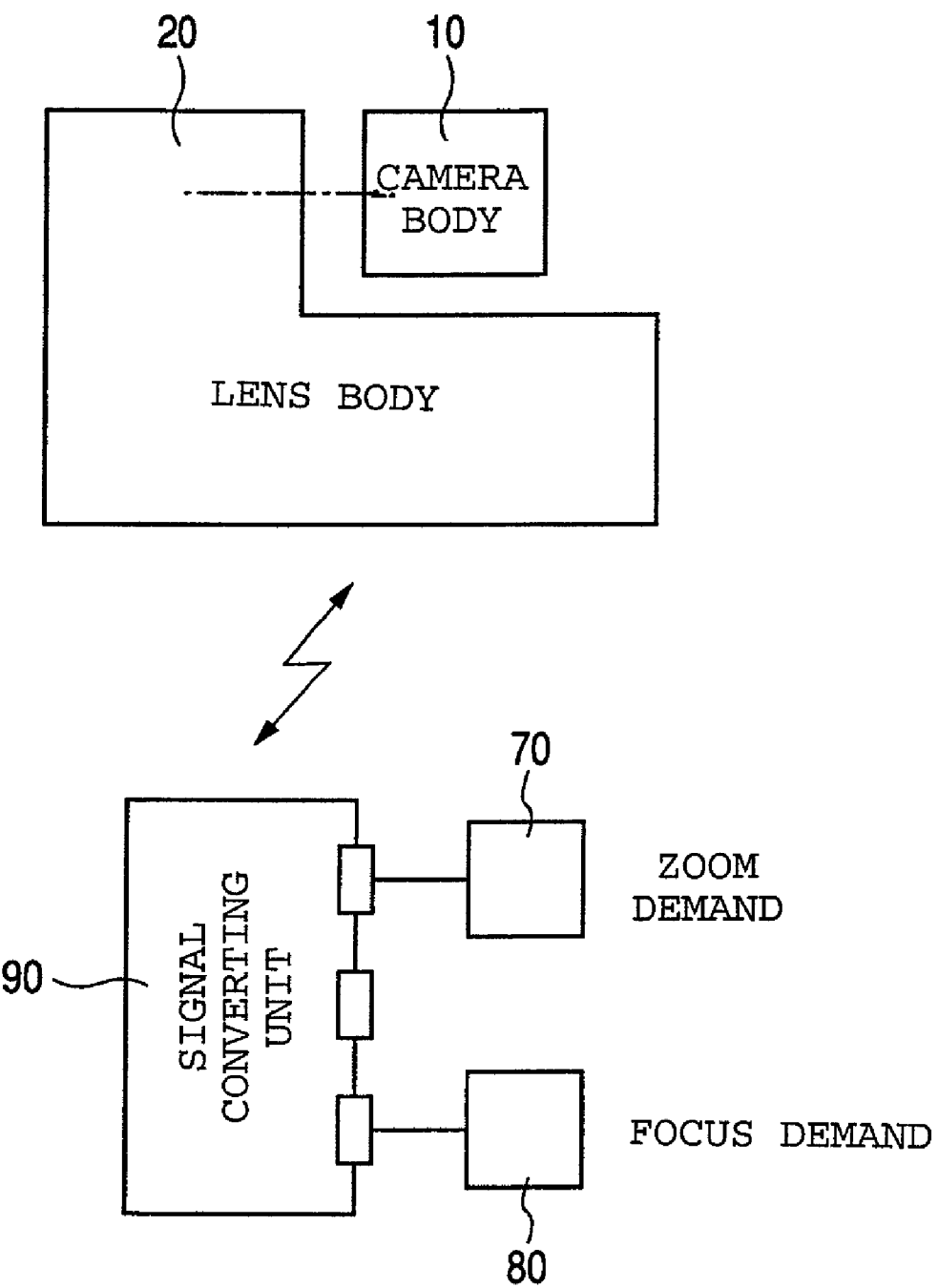
FIG. 1 is a diagram schematically showing the general structure of a first embodiment.

FIG. 1 schematically illustrates the general structure of an embodiment.

An apparatus according to the embodiment includes a lens body 20 mounted on a camera body 10 and a signal converting unit 90 serving as signal converting means to which command units to be operated by a camera operator including a zoom demand 70 and a focus demand 80 are connected by cables.

The lens body 20 and the signal converting unit 90 are configured to communicate with each other by wireless connection.

Figures 2, 2A, 2B:
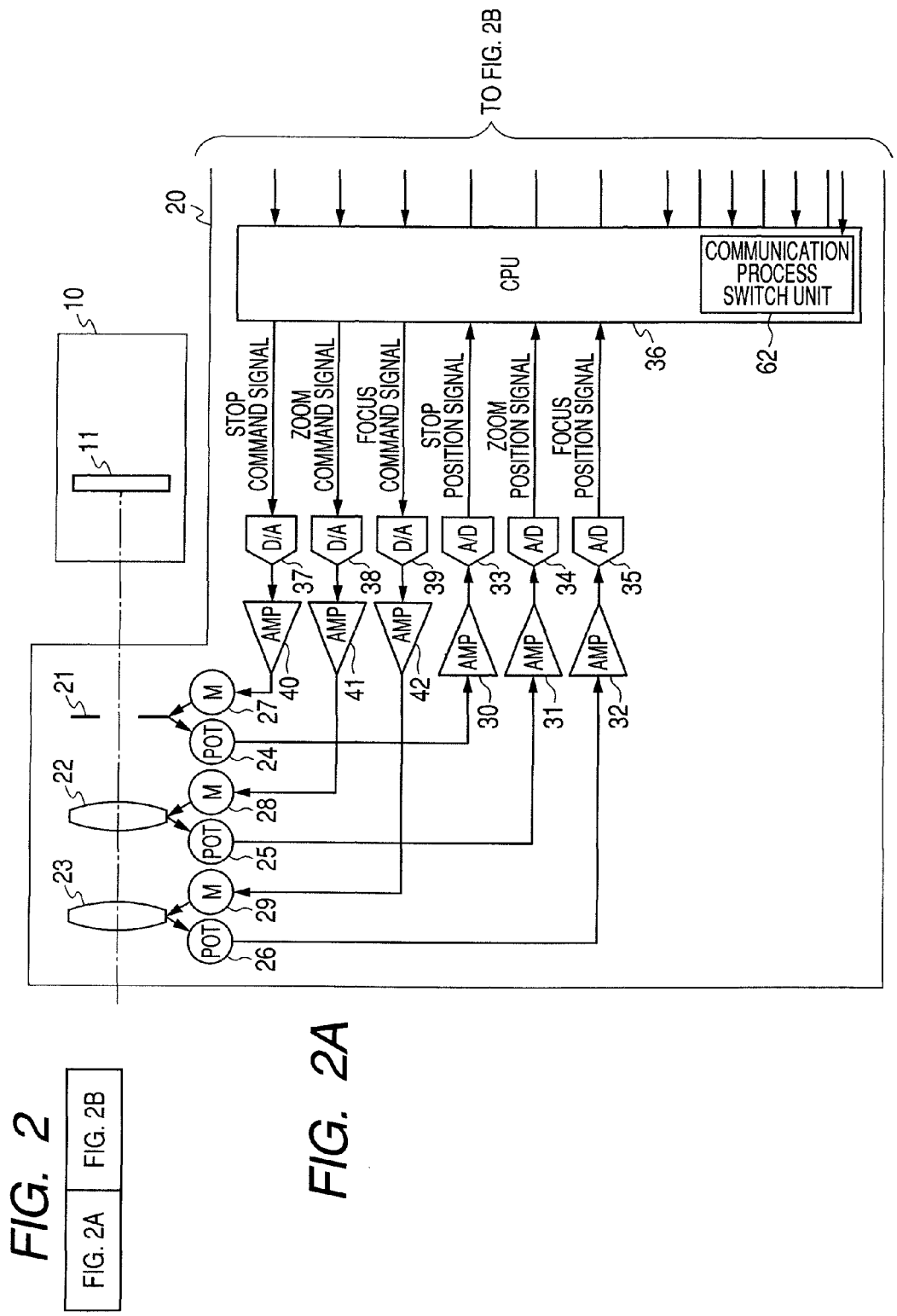
FIG. 2 comprising
FIGS. 2A and 2B is a circuit block diagram of a camera body and a lens body.
Figure 2B:
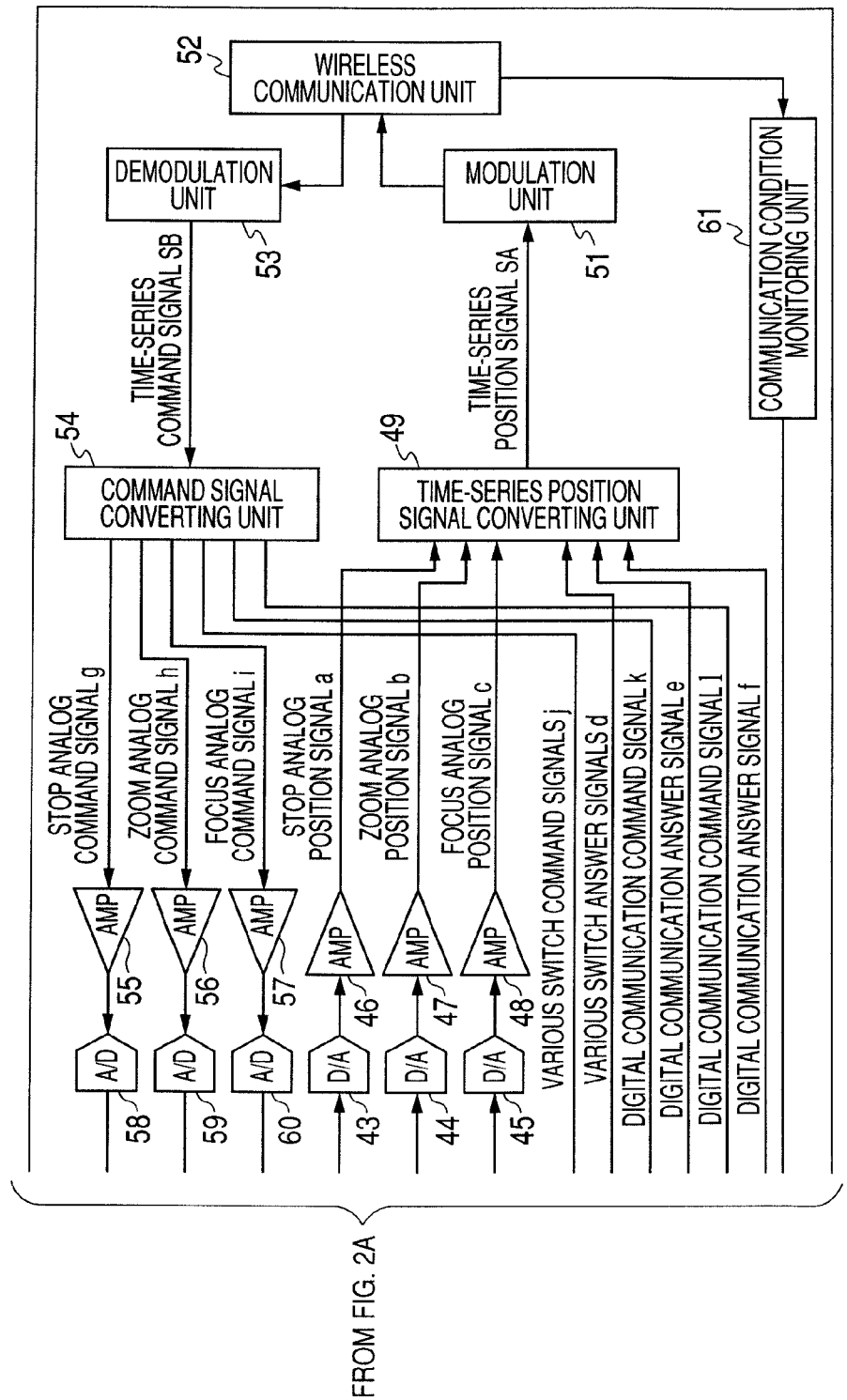

FIGS. 2A and 2B are circuit block diagrams of the camera body 10 and the lens body 20.

The shooting apparatus according to this embodiment includes the lens body 20, the camera body 10 attached to the lens body 20, the zoom demand 70, the focus demand 80 and the signal converting unit 90.

The camera body 10 is provided with an image pickup element 11 in the form of a CCD.

The lens body 20 has movable optical members including a stop 21, a zooming lens 22 and a focusing lens 23, which are arranged on the optical axis of the image pickup element 11.

For the stop 21, the zooming lens 22 and the focusing lens 23, there are provided a stop potentiometer 24, a zoom potentiometer 25 and a focus potentiometer 26 that detect the positions of the corresponding movable optical members respectively.

In addition, a stop motor 27, a zoom motor 28 and a focus motor 29 that drive the respective movable optical members are also provided.

The outputs of the stop potentiometer 24, the zoom potentiometer 25 and the focus potentiometer 26 are connected to a CPU 36 via amplifiers 30, 31 and 32 and A/D converters 33, 34 and 35 respectively.

Outputs of the CPU 36 are connected to the stop motor 27, the zoom motor 28 and the focus motor 29 via D/A converters 37, 38 and 39 and amplifiers 40, 41 and 42 respectively.

Other outputs of the CPU 36 including a stop analog position signal a, a zoom analog position signal b and a focus analog position signal c are connected to time-series position signal converting unit 49 via D/A converters 43, 44 and 45 and amplifiers 46, 47 and 48 respectively.

To the time-series position signal converting unit 49 are also connected various switch answer signals d, and digital communication answer signals e and f from the CPU 36.

Furthermore, a time-series position signal SA as the output of the time-series position signal converting unit 49 is connected to wireless communication unit 52 via modulation unit 51.

On the other hand, a time series command signal SB as an output of the wireless communication unit 52 that has received a signal from the signal converting unit 90 is connected to command signal converting unit 54 via demodulation unit 53.

A stop analog command signal g, a zoom analog command signal h and a focus analog command signal i as outputs of the command signal converting unit 54 are connected to the CPU 36 via amplifiers 55, 56 and 57 and A/D converters 58, 59 and 60 respectively.

In addition, the CPU 36 receives various switch command signals j and digital communication command signals k and l from the command signal converting unit 54.

Furthermore, an output of the wireless communication unit 52 is connected to communication process switch unit 62, which is connected to the CPU 36 via communication condition monitoring unit 61.

In the lens body 20, the stop, zoom and focus drive command signals given as digital values from the CPU 36 are converted into analog values by the D/A converters 37, 38 and 39.

The motors 27, 28 and 29 are driven by analog drive signals supplied from the D/A converters 37, 38 and 39 and electrically amplified by the amplifiers 40, 41 and 42 respectively, so that the corresponding movable optical members are operated.

The amplifiers 30, 31 and 32 amplify the signals from the potentiometers 24, 25 and 26.

The A/D converters 33, 34 and 35 convert the analog voltages of the potentiometers 24, 25 and 26 applied through the amplifiers 30, 31 and 32 into digital values, which are read by the CPU 36 as the stop position, zooming lens position and focusing lens position respectively.

In connection with the above, encoders may be used as position detection unit in place of the potentiometers 24, 25 and 26.

The wireless communication unit 52 is configured to receive wireless data from the signal converting unit 90 that will be described later, convert modulated data to be transmitted from the lens body 20 to the signal converting unit 90 into wireless data and transmit it.

The demodulation unit 53 demodulates the modulated data received by the wireless communication unit 52 to convert it into time-series command signals SB.

The command signal converting unit 54 divides the series of time-series command signals SB from the demodulation unit 53 into a stop analog command signal g, a zoom analog command signal h, a focus analog command signal i, various switch command signals j, a digital communication command signal k and a digital communication command signal l.

The amplifiers 55, 56 and 57 amplify and match the stop analog command signal g, the zoom analog command signal h and the focus analog command signal i divided by the command signal converting unit 54.

The A/D converters 58, 59 and 60 send the command signals g, h and i supplied from the amplifiers 55, 56 and 57 to the CPU 36.

The D/A converters 43, 44 and 45 and the amplifiers 46, 47 and 48 are configured to generate a stop analog position signal a, a zoom analog position signal b and a focus analog position signal c to be sent from the CPU 36 to the zoom demand 70 and the focus demand 80.

These analog position signals a, b and c are converted into time-series position signals SA by the time-series position signal converting unit 49.

The time-series position signal converting unit 49 also receives various switch answer signals d, a digital communication answer signal e and a digital communication answer signal f from the CPU 36 and converts them into a series of time-series position signals SA.

The demodulation unit 51 demodulates the time-series position signals SA from the time-series position signal converting unit 49 and sends the modulated time-series position signals SA to the wireless communication unit 52 arranged in the downstream.

The communication condition monitoring unit 61 monitors the condition of the wireless communication of the wireless communication unit 52. The communication process switch unit 62 evaluates an index indicative of the condition of the wireless communication supplied from the communication condition monitoring unit 61 and switches the communication process.

The CPU 36 receives the analog stop command signal g, the analog zoom command signal h and the analog focus command signal i from the command signal converting unit 54 via the amplifiers 55, 56 and 57 and the A/D converters 58, 59 and 60.

The CPU 36 also receives digital communication command signals k and l.

The CPU 36 performs computation based on the stop, zoom and focus command signals g, h and i thus received and the stop, zoom and focus positions received from the respective potentiometers 24, 25 and 26.

Then, the CPU 36 outputs various command signals for controlling driving of the motors 27, 28 and 29.

FIGS. 3A and 3B are circuit block diagrams of the zoom demand 70, the focus demand 80 and the signal converting unit 90.

The zoom demand 70 and the focus demand 80 are connected to the signal converting unit 90 via cables and connectors 101, 102 and 103.

The zoom demand 70 is configured to output various switch command signals including a return switch command signal, a VTR switch command signal, a shot command signal and a shot memory command signal in addition to the zoom command signal.

The focus demand 80 is configured to output various switch command signals including a return switch signal, a VTR switch signal, a shot command signal and a shot memory signal in addition to the focus command signal.

In the signal converting unit 90, signals received through the connectors 101 to 103 are connected to time-series command signal converting unit 91.

Such signals include the stop analog command signal g, the zoom analog command signal h, the focus analog command signal i, the various switch command signals j, the digital communication command signal k and the digital communication command signal l.

The time-series command signals SB obtained by conversion in the time-series command signal converting unit 91 are supplied to wireless communication unit 93 via modulation unit 92.

Time-series position signals SA received from the lens body 20 through the wireless communication unit 93 are supplied to the position signal converting unit 95 via demodulation unit 94.

By conversion in the position signal converting unit 95, a stop analog position signal a, a zoom analog position signal b, a focus analog position signal c, various switch answer signals d, a digital communication answer signal e and a digital communication answer signal f are obtained and output.

These signals are connected to the zoom demand 70 and the focus demand 80 through the connectors 101 to 103.

Furthermore, an output of the wireless communication unit 93 is connected to communication process switch unit 97 via communication condition monitoring unit 96.

Electric power is supplied from the power supply unit 98 to the zoom demand 70 and the focus demand 80 through the connectors 101 to 103.

The connectors 101 to 103 in the signal converting unit 90 allow connection to the zoom demand 70 and the focus demand 80 by cables. Each of the connectors 101 to 103 has multiple pins including about 20 pins as with prior art connectors.

To the time-series command signal converting unit 91 are input the stop analog command signal g, the zoom analog command signal h, the focus analog command signal i, the various switch command signals j, the digital communication command signal k and the digital communication command signal l via the connectors 101 to 103.

The time-series command signal converting unit 91 converts these signals into time-series command signals SB which are serial signals.

The modulation unit 92 modulates the time-series command signals SB.

The wireless communication unit 93 converts the modulated time-series command signals SB supplied from the modulation unit 92 into wireless signals and transmits them. In addition, the wireless communication unit 93 receives the wireless time-series position signals SA transmitted from the wireless communication unit 52 of the lens body 20.

The demodulation unit 94 demodulates the time-series position signals SA received and modulated by the wireless communication unit 93.

The position signal converting unit 95 divides the time-series position signals SA from the demodulation unit 94 into the stop analog position signal a, the zoom analog position signal b, the focus analog position signal c, the various switch answer signals d, the digital communication answer signal e and the digital communication answer signal f and outputs them.

The communication condition monitoring unit 96 monitors the condition of the wireless communication of the wireless communication unit 93. The communication process switch unit 97 determines an index indicative of the condition of the wireless communication supplied from the communication condition monitoring unit 96 and switches the communication process depending on the determination.

The power supply unit 98 includes a battery or an AC adaptor that is required to drive the zoom demand 7, the focus demand 80 and the signal converting unit 90.

The wireless communication unit 52, 93 may use a standardized communication scheme such as wireless LAN, Bluetooth or Zigbee.

FIG. 4 is a flowchart of a process in the time-series command signal converting unit 91 of the signal converting unit 90.

In step S100, the process in the time-series command signal converting unit 91 is started.

In step S101, return switch signals included in the various switch command signals j supplied from the demands 70 and 80 are read in. The return switch signals thus obtained are output to the time-series command signals SB in step S102.

In step S103, VTR switch signals included in the various switch command signals j supplied from the demands 70 and 80 are read in. The VTR switch signals thus obtained are output to the time-series command signals SB in step S104.

Then in step S105, shot memory switch signals included in the various switch command signals j supplied from the demands 70 and 80 are read in. The shot memory switch signals thus obtained are output to the time-series command signals SB in step S106.

In step S107, shot command switch signals included in the various switch command signals j supplied from the demands 70 and 80 are read in. The shot command switch signals thus obtained are output to the time-series command signals SB in step S108.

In step S109, a stop analog command signal g supplied from the demands 70 and/or 80 is read, and its value is output to the time-series command signals SB in step S110.

In step S111, a focus analog command signal i supplied from the demand 80 is read in, and its value is output to the time-series command signals SB in step S112.

Then in step S113, a zoom analog command signal h supplied from the demands 70 and 80 are read in, and its value is output to the time-series command signals SB in step S114.

In step S115, a digital communication command signal k supplied from the demands 70 and 80 is read in. The digital communication command signal k is output to the time-series command signals SB in step S116.

In step 117, a digital communication command signal l supplied from the demands 70 and 80 is read in. The digital communication command signal l is output to the time-series command signals SB in step S118. After that, the process returns to step S101, and the same process as above is repeatedly performed.

Figure 5:
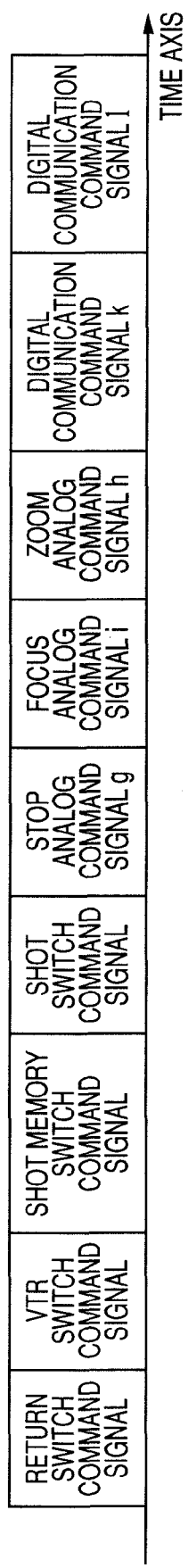
FIG. 5 illustrates time-series command signal SB.

By the above process, a plurality of command signals which are output of the multiple demands 70 and 80 are converted into a series of time-series command signals SB as illustrated in FIG. 5.

In connection with this, signals of different communication schemes such as a contact signal and a serial communication signal can also be converted into a series of time-series command signals SB which is a serial signal.

After that, the time-series command signals SB are modulated and converted into wireless signals by the modulation unit 92 and the wireless communication unit 93 and transmitted to the lens body 20.

Figure 6B:
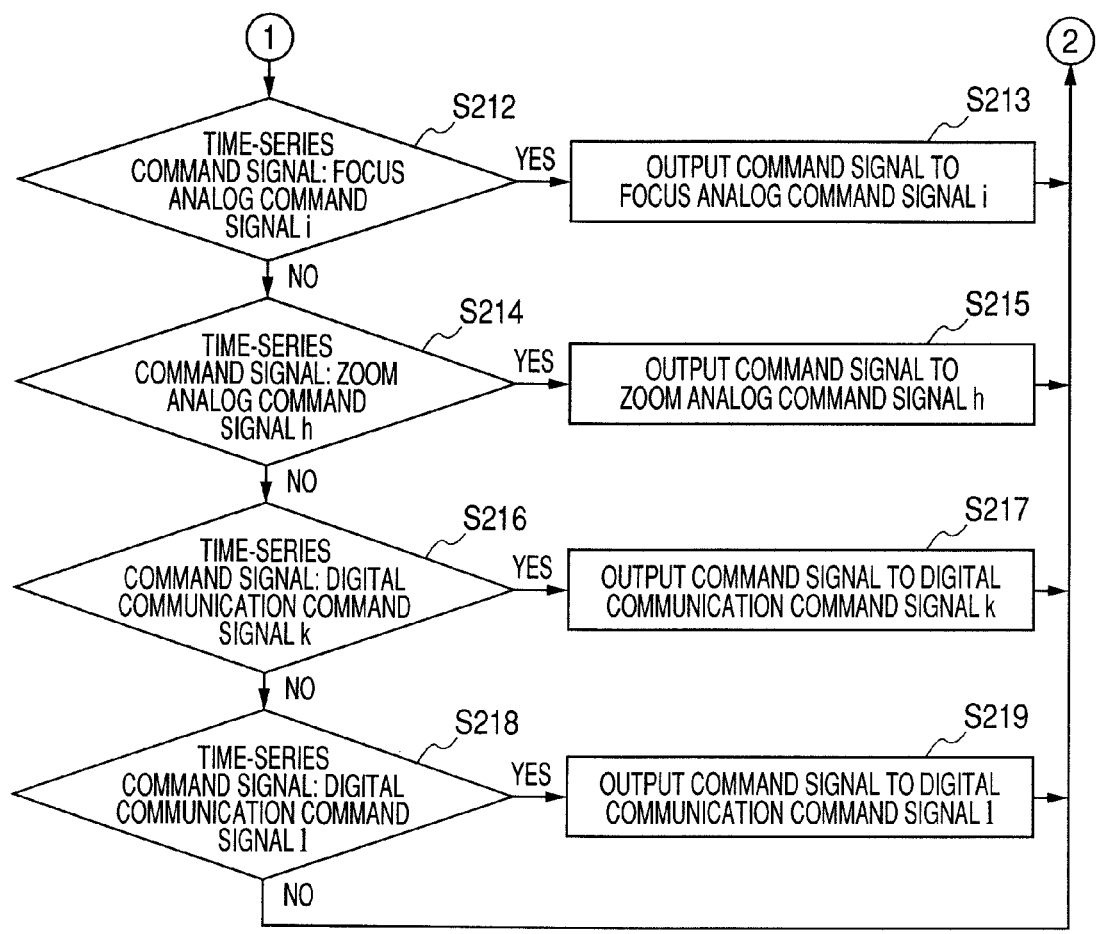

FIGS. 6A and 6B are flow charts of a process in the command signal converting unit 54 in the lens body 20.

In step 200, the process in the command signal converting unit 54 is started.

In step S201, a time-series command signal is read in, and a determination is made as to whether the time-series command signal is a return switch command signal or not in step S202.

If the time-series command signal read is the return switch command signal, the process proceeds to step S203. If the time-series command signal read is not the return switch command signal, the process proceeds to step S204.

In step S203, the value of the command signal is output to a return switch output line included in the various switch command signals j, and thereafter the process returns to step S201.

In step S204, a determination is made as to whether the time-series command signal read is a VTR switch command signal or not. If the time-series command signal is the VTR switch command signal, the process proceeds to step S205. If the time-series command signal is not the VTR switch command signal, the process proceeds to step S206.

In step S205, the value of the command signal is output to a VTR switch output line included in the various switch command signals j, and thereafter the process returns to step S201.

In step S206, a determination is made as to whether the time-series command signal read is a shot memory command signal or not. If the time-series command signal is the shot memory command signal, the process proceeds to step S207. If the time-series command signal is not the shot memory command signal, the process proceeds to step S208.

In step S207, the value of the command signal is output to a shot memory output line included in the various switch command signals j, and thereafter the process returns to step S201.

In step S208, a determination is made as to whether the time-series command signal read is a shot command signal or not. If the time-series command signal is the shot command signal, the process proceeds to step S209. If the time-series command signal is not the shot command signal, the process proceeds to step S210.

In step S209, the value of the command signal is output to a shot output line included in the various switch command signals j, and thereafter the process returns to step S201.

In step S210, a determination is made as to whether the time-series command signal read is a stop analog command signal g or not. If the time-series command signal is the stop analog command signal g, the process proceeds to step S211. If the time-series command signal is not the stop analog command signal g, the process proceeds to step S212.

In step S211, the value of the command signal is output to the stop analog command signal g, and thereafter the process returns to step S201.

In step S212, a determination is made as to whether the time-series command signal read is a focus analog command signal i or not. If the time-series command signal is the focus analog command signal i, the process proceeds to step S213. If the time-series command signal is not the focus analog command signal i, the process proceeds to step S214.

In step S213, the value of the command signal is output to the focus analog command signal i, and thereafter the process returns to step S201.

In step S214, a determination is made as to whether the time-series command signal read is a zoom analog command signal h or not. If the time-series command signal is the zoom analog command signal h, the process proceeds to step S215. If the time-series command signal is not the zoom analog command signal h, the process proceeds to step S216.

In step S215, the value of the command signal is output to the zoom analog command signal h, and thereafter the process returns to step S201.

In step S216, a determination is made as to whether the time-series command signal read is a digital communication command signal k or not. If the time-series command signal is the digital communication command signal k, the process proceeds to step S217. If the time-series command signal is not the digital communication command signal k, the process proceeds to step S218.

In step S217, the value of the command signal is output to the digital communication command signal k, and thereafter the process returns to step S201.

In step S218, a determination is made as to whether the time-series command signal read is a digital communication command signal l or not. If the time-series command signal is the digital communication command signal l, the process proceeds to step S219. If the time-series command signal is not the digital communication command signal l, the process returns to step S201.

In step S219, the value of the command signal is output to the digital communication command signal l, and thereafter the process returns to step S201.

By the above process, the time-series command signals SB taken in through the wireless communication unit 52 and the demodulation unit 53 are converted back into the original command signals by the command signal converting unit 54 in the lens body 20.

The process in the time-series position signal converting unit 49 is similar to the process in the time-series command signal converting unit 91 shown in FIGS. 4 and 5, and the process in the position signal converting unit 95 is similar to the process in the command signal converting unit 54 shown in FIGS. 6A and 6B.

The communication condition monitoring units 61 and 96 are provided in the lens body 20 and the signal converting unit 90, respectively, to monitor the communication condition of the wireless communication units 52 and 93.

Specifically, the communication condition monitoring units 61 and 96 check whether data is correctly transmitted and received between the wireless communication units 52 and 93 each time the data is transmitted or received or at regular intervals and display the result as a numeral index on a communication condition display unit that is not shown in the drawings.

The above checking process is enabled for example by transmitting the communication error rate representing the ratio of the number of data involving receive error to the number of received data, mutually from the data receiving side to the data transmitting side.

The communication process switch units 62, 97 read a numerical value such as the communication error rate indicative of the communication condition output from the communication condition monitoring units 61, 96, determine the current communication condition, and select the communication process that is most suitable for the current communication condition.

FIG. 7 is a flow chart of a process in the communication process switch unit 97 of the signal converting unit 90.

In step S300, the process is started. In step S301, a communication error rate as an index of the communication condition is read from the communication condition monitoring unit 96.

In step S302, the communication error rate is compared with a reference value, which is, for instance, 0.9. The reference value can be arbitrarily set and changed.

If it is determined in step S302 that the communication error rate is greater than 0.9, which means that the number of errors is small and the communication condition is good, the process proceeds to step S303. On the other hand, if it is determined in step S302 that there are a large number of errors and the communication condition is bad, the process proceeds to step S304.

That is, when the communication error rate is greater than a predetermined value, the process proceeds to step S303. On the other hand, when the communication error rate is equal to or smaller than the predetermined value, the process proceeds to step S304.

In step S303, the series of time-series command signals SB shown in FIG. 5 is transmitted only when the command states of command signals of the zoom demand 70 and the focus demand 80 change, and then the process returns to step S301.

On the other hand, in step S304, the series of time-series command signals SB is transmitted at a regular communication period or cycle, and the process returns to step S301.

According to the process shown in FIG. 7, while the communication condition is good, the time-series command signals SB are output only when the command signals of the demands 70 and 80 change.

By this feature, useless transmission is eliminated, whereby the power consumption of the power supply unit 98 in the signal converting unit 90 can be reduced and the battery life can be extended.

Furthermore, when the communication condition becomes bad, the time-series command signals SB shown in FIG. 5 are transmitted at a regular period to increase the number of times of transmission, whereby reliability of transmitted data can be increased.

Furthermore, by setting the threshold value for the communication error rate supplied from the communication condition monitoring units 61, 96 and providing the display unit having an LED or the like that is to be turned on/turned off/blinked, a user such as a camera operator can be informed of the current communication condition.

Thus, the operator can be aware of bad communication condition and can change the positional relationship and/or distance between the lens body 20 and the signal converting unit 90 to make the communication condition better.

Although the foregoing description has been directed to the communication condition monitoring unit 96 and the communication process switch unit 97 provided in the signal converting unit 90, the operation and advantages of the communication condition monitoring unit 61 and the communication process switch unit 62 provided in the lens body 20 are the same as those in the signal converting unit 90.

The communication condition display unit may be provided in both or either one of the lens body 20 and the signal converting unit 90.

With the above described configuration, connection cables that connect the lens body 20 and the demands 70, 80 can be eliminated, and reliability of data transmission can be ensured even when the wireless communication condition changes.

Thus, there can be provided a lens apparatus that is easy to set and operate and having assured reliability irrespective of the relative position of the lens body 20 and the demands 70, 80. In addition, the apparatus allows quick changing of the operation style from the tripod operation to the shoulder operation.

In this embodiment, the command signal converting unit 54, the time-series position signal converting unit 49, the demodulation unit 53, the modulation unit 51, the wireless communication unit 52, the communication condition monitoring unit 61 and the communication process switch unit 62 are provided in the lens body 20.

However, these elements may be provided in a separate adaptor eternally of the lens body 20.

Figure 14:
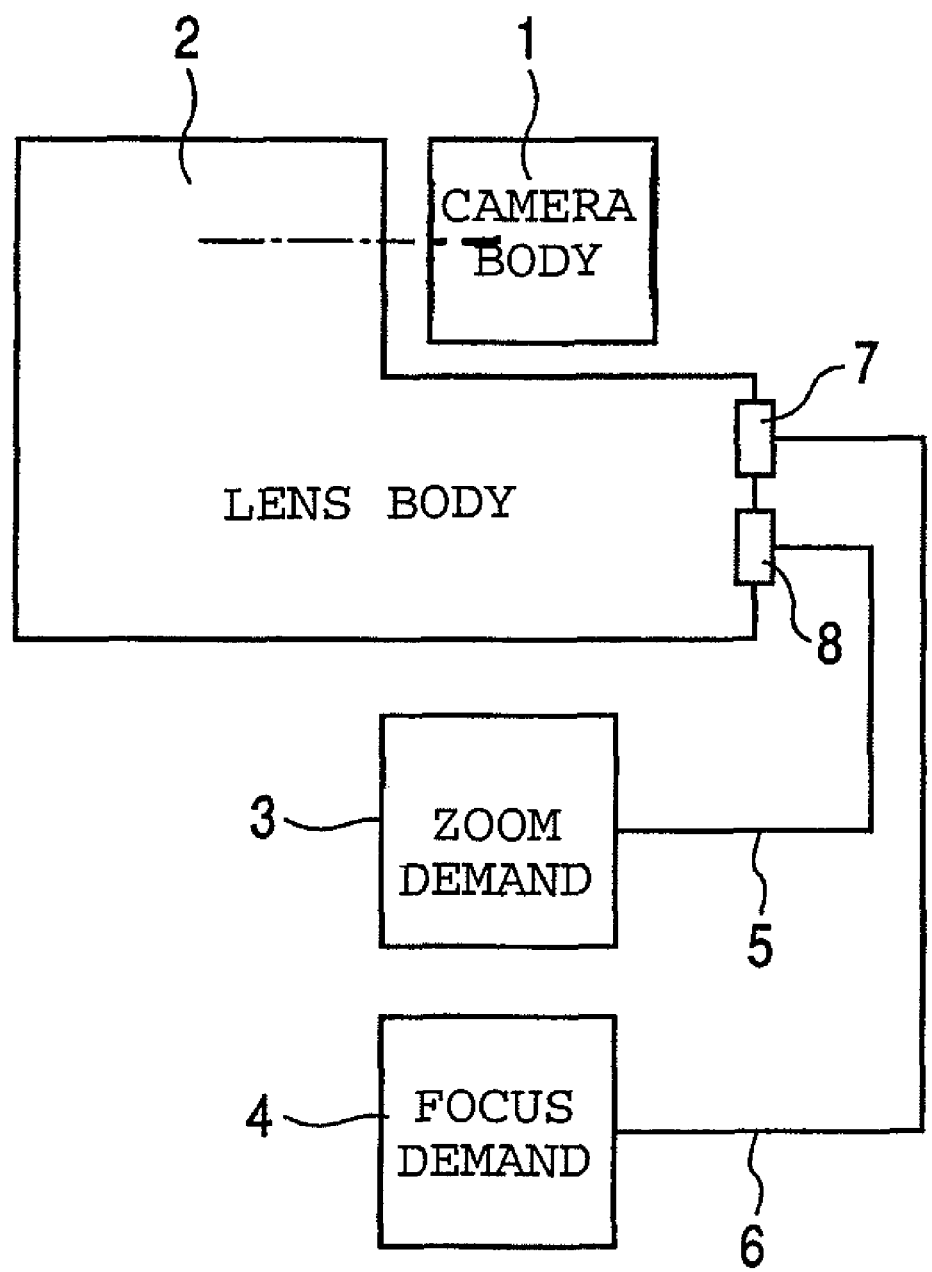
FIG. 14 is a block diagram of a prior art.

In that case, by using the additional adaptor and the signal converting unit 90 with an existing lens body 1 shown in FIG. 14, a risk of breakage of cables etc. is eliminated while using an existing lens system.

Thus, reliability and operability of the system can be enhanced.

Although in the above-described embodiment, the CPU 36, the command signal converting unit 54, the time-series position signal converting unit 49, the communication condition monitoring unit 61 and the communication process switch unit 62 are configured as separate units, the above-mentioned various units may be configured by the same single CPU 36.

In the above described embodiment, the optical movable members include the stop 21, the zoom lens 22 and the focus lens 23.

Other movable optical members include an extender lens and an image stabilizer etc, and the same advantageous effects are achieved when these members are commanded and controlled.

By adopting the configuration of this embodiment, the reliability of wireless data communication can be maintained or enhanced thanks to the communication condition monitoring unit and the communication process switch unit even when there is interference or influence of directivity involved by the use of wireless communication. In addition, the operation style can be quickly changed from the tripod operation to the shoulder operation by dismounting the apparatus from a tripod.

Second Embodiment

FIG. 8 is a flow chart of a process in the communication process switch unit 97 of the signal converting unit 90 according to the second embodiment. The second embodiment differs from the first embodiment in the process in the communication process switch unit 97.

The process is started in step S400. In step S401, a communication error rate as an index of the communication condition is read from the communication condition monitoring unit 96.

In step S402, the communication error rate is compared with a reference value, which is, in this embodiment, 0.9. The reference value can be arbitrarily set and changed.

If it is determined in step S402 that the communication error rate is greater than 0.9, in other words, if the number of errors is small and the communication condition is good, the process proceeds to step S403. On the other hand, if it is determined in step S402 that there are a large number of errors and the communication condition is bad, the process proceeds to step S404.

In step S403, the series of time-series command signals SB shown in FIG. 5 is transmitted repeatedly at a first regular communication period T1, and then the process returns to step S401.

In step S404, on the other hand, the series of time-series command signals SB is transmitted repeatedly at a second regular communication period T2 that is shorter than the first regular communication period T1, and then the process returns to step S401.

According to the process shown in FIG. 8, when the communication condition is good, the communication is performed at the first regular communication period T1.

On the other hand, when the communication condition is bad, the time-series command signals SB are transmitted at the second regular communication cycle T2. Thus, the number of times of transmission is increased when the communication condition is bad, whereby the reliability of transmitted data can be enhanced.

Although the foregoing description has been directed to the communication condition monitoring unit 96 and the communication process switch unit 97 provided in the signal converting unit 90, the operation and advantages of the communication condition monitoring unit 61 and the communication process switch unit 62 provided in the lens body 20 are the same as those in the signal converting unit 90.

Third Embodiment

FIG. 9 is a flow chart of a process in the communication process switch unit 97 of the signal converting unit 90 according to the third embodiment. The process in the communication process switch unit 97 is different from those in the above described embodiments.

The process is started in step S500. In step S501, a communication error rate as an index of the communication condition is read from the communication condition monitoring unit 96.

In step S502, the communication error rate is compared with a reference value of 0.9.

If it is determined in step S502 that the communication error rate is greater than 0.9, in other words, if the number of errors is small and the communication condition is good, the process proceeds to step S503. On the other hand, if it is determined in step S502 that there are a large number of errors and the communication condition is bad, the process proceeds to step S504.

In step S503, the wireless transmission power is set to a first level P1, and then the process proceeds to step S505.

Since the wireless transmission power is proportional to the product of current and voltage, the wireless transmission power can be changed by changing the current and/or the voltage.

In step S504, on the other hand, the wireless transmission power is set to a second level P2 that is higher than the first level P1, and then the process proceeds to step S505.

Then in step S505, the series of time-series command signals SB shown in FIG. 5 is transmitted repeatedly at a regular period, and then the process returns to step S501.

According to the process shown in FIG. 9, when the communication condition is good, the wireless transmission power is set to the first level P1 which is relatively low, and when the communication condition is bad, the wireless transmission power is set to the second level P2 which is relatively high. Thereafter, the time-series command signals SB are transmitted.

By this process, even when the communication condition becomes bad the reliability of transmitted data can be enhanced by increasing the wireless communication power.

Although the foregoing description has been directed to the communication condition monitoring unit 96 and the communication process switch unit 97 provided in the signal converting unit 90, the operation and advantages of the communication condition monitoring unit 61 and the communication process switch unit 62 provided in the lens body 20 are the same as those in the signal converting unit 90.

Fourth Embodiment

FIG. 10 is a flow chart of a process in the communication process switch unit 97 of the signal converting unit 90 according to the fourth embodiment. The process in the communication process switch unit 97 is different from those in the above described embodiments.

The process is started in step S600. In step S601, a communication error rate as an index of the communication condition is read from the communication condition monitoring unit 96.

In step S602, the communication error rate is compared with a reference value of 0.9.

If it is determined in step S602 that the communication error rate is greater than 0.9, in other words, if the number of errors is small and the communication condition is good, the process proceeds to step S603. On the other hand, if it is determined in step S602 that there are a large number of errors and the communication condition is bad, the process proceeds to step S604.

In step S603, a series of time-series command signals SB is transmitted, and then the process returns to step S601.

On the other hand, in step S604, the series of time-series command signals SC is transmitted, the number of times of transmission of each signal being determined according to the order of priority of the function of the demand. Then, the process returns to step S601.

Figure 11:
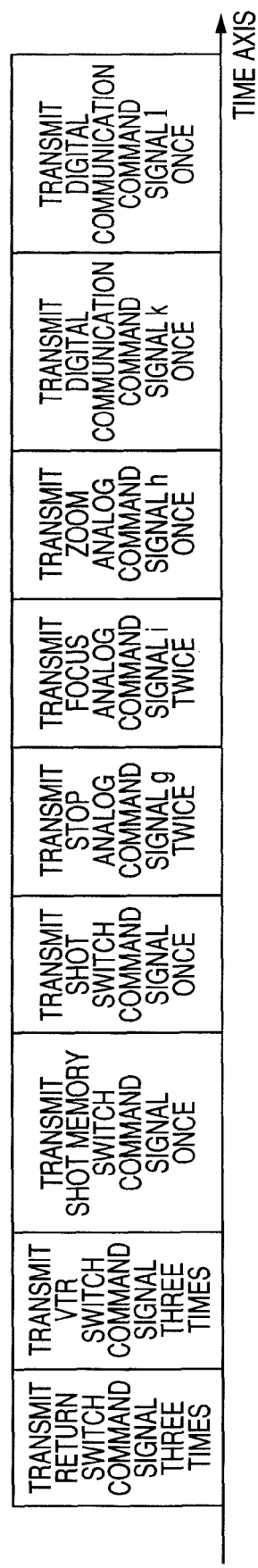
FIG. 11 illustrates time-series command signals SC.

FIG. 11 illustrates an example of the series of time-series command signals SC in which the number of times of transmission of each signal is determined according to the order of priority of the function of the command unit.

In the communication process, the return switch command signal and the VTR switch command signal, which require the responsiveness corresponding to the functional switches in the lens body 20 and to which the first priority is assigned, are transmitted three times.

The stop analog command signal g and the focus analog command signal I, to which the second priority is assigned, are transmitted twice. The other command signals are transmitted once.

When the communication condition is good, the time series command signals SB shown in FIG. 5 are sent by the process shown in FIG. 10.

When the communication condition is bad, the time-series command signals SC shown in FIG. 11 are sent, whereby the reliability of the transmitted data can be enhanced according to the order of priority of the functions even when the communication condition becomes bad.

Although the foregoing description has been directed to the communication condition monitoring unit 96 and the communication process switch unit 97 provided in the signal converting unit 90, the operation and advantages of the communication condition monitoring unit 61 and the communication process switch unit 62 provided in the lens body 20 are the same as those in the signal converting unit 90.

Various processes of the communication process switch unit 97 illustrated in the flow charts of FIGS. 7 to 10 have been described. Some of these processes may be applied in combination. In that case also, the same or similar advantageous effects will be achieved.

Fifth Embodiment

FIGS. 12A to 13B are diagrams illustrating the configuration of the fifth embodiment.

Figures 12, 12A:
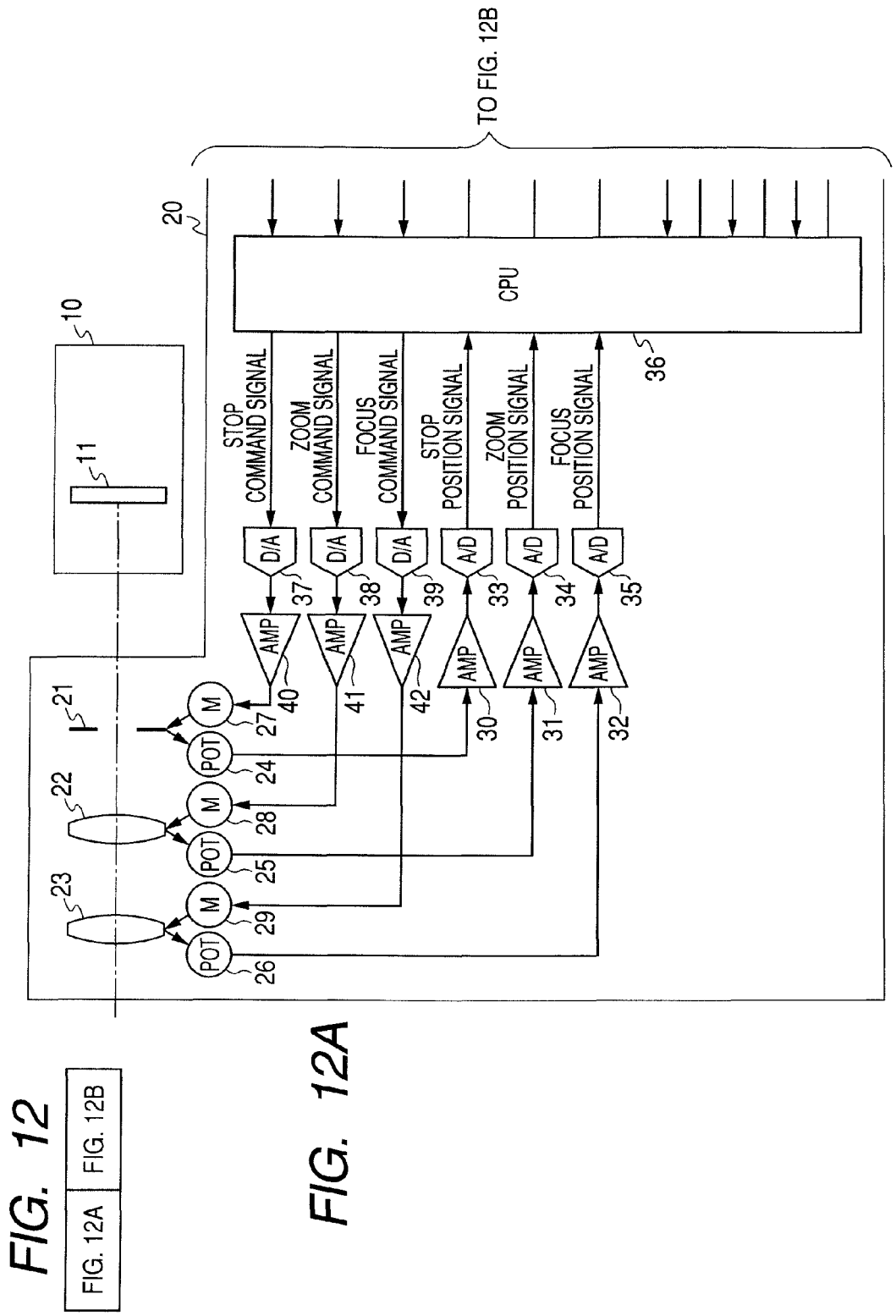
FIG. 12 comprising
FIGS. 12A and 12B is a circuit block diagram of a camera body and a lens body according to a fifth embodiment.
Figure 12B:
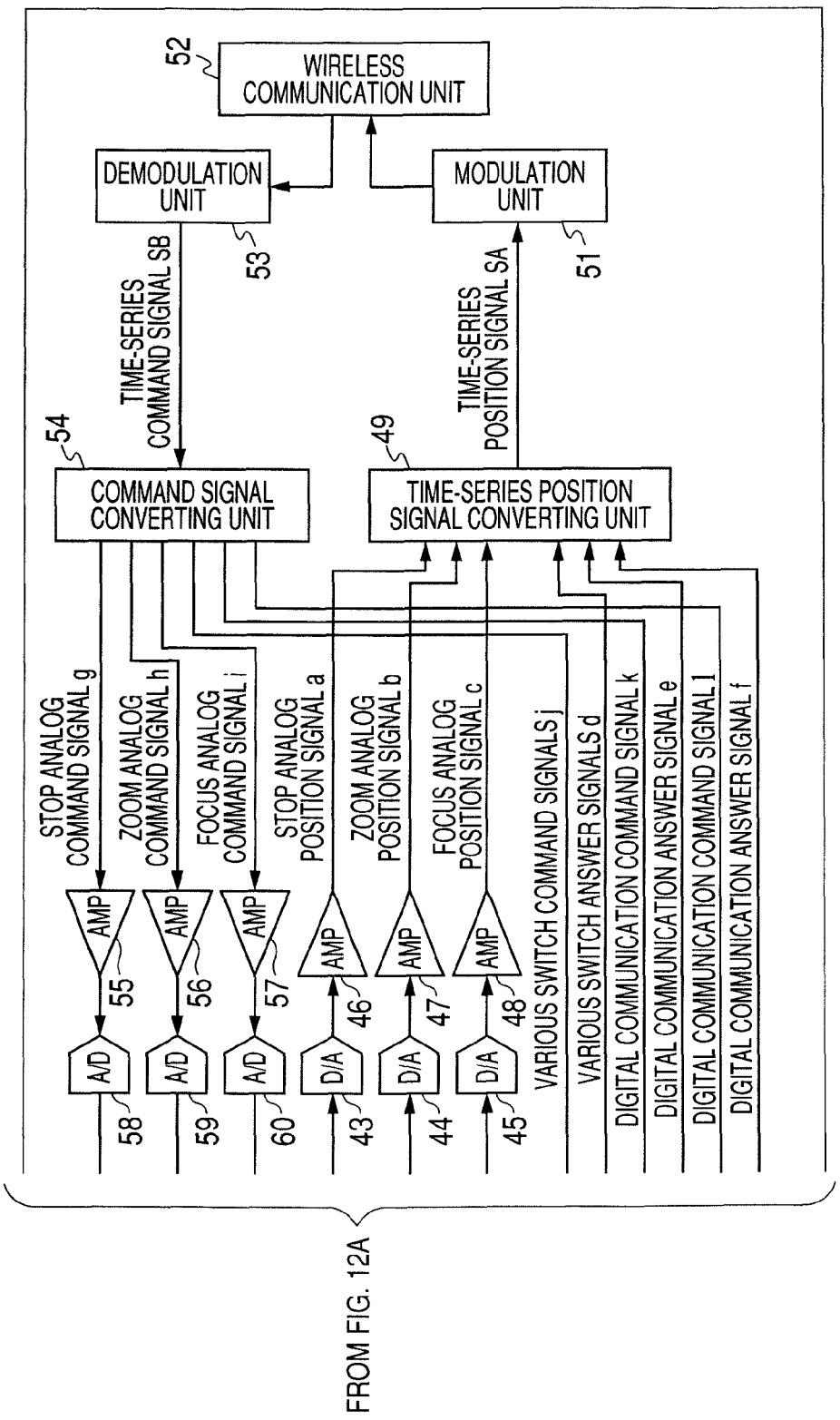

The fifth embodiment differs from the first embodiment in that the communication condition monitoring unit 61 and the communication process switch unit 62 have been eliminated from the lens body 20, as will be seen from FIGS. 12A and 12B.

Figure 13B:
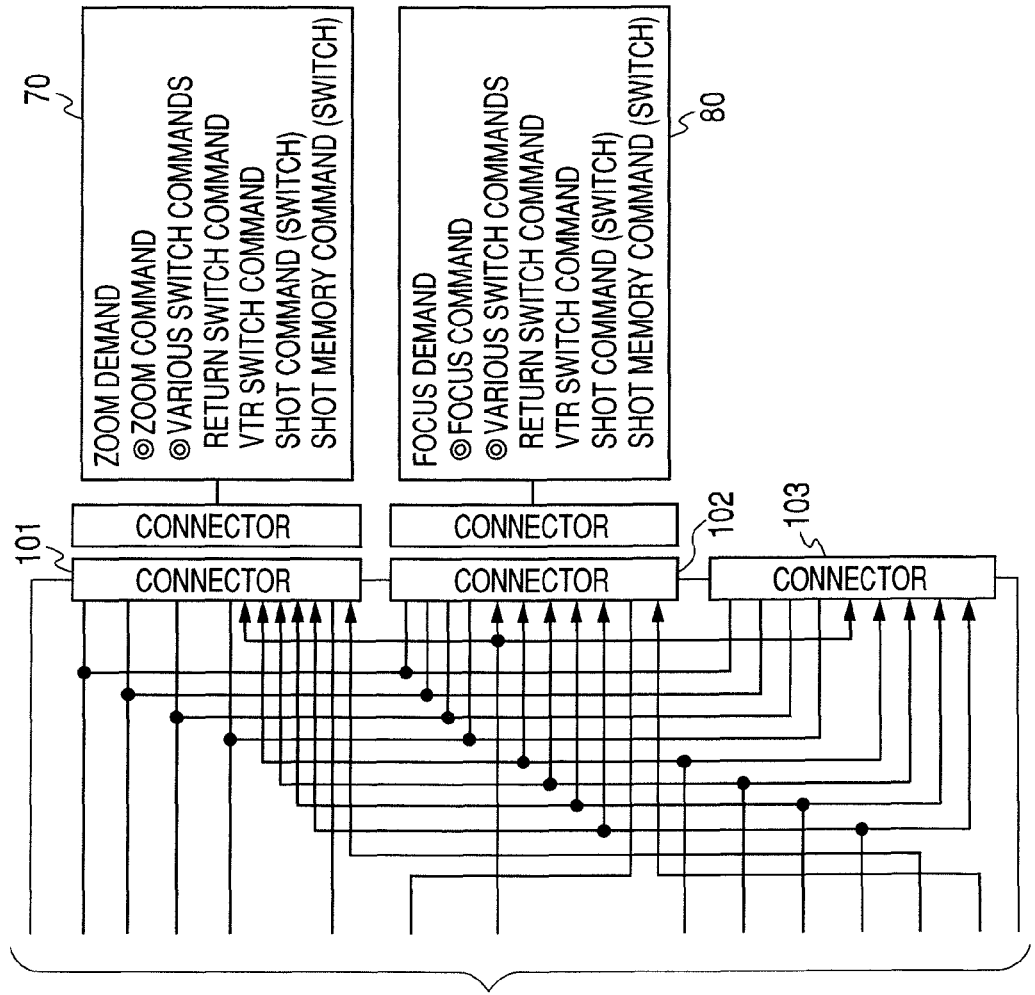

In addition, the fifth embodiment differs from the first embodiment in that the communication condition monitoring unit 96 and the communication process switch unit 97 have been eliminated from the signal converting unit 90, as will be seen from FIGS. 13A and 13B.

Time-series command signals SB are modulated in modulation unit 92, then converted into wireless signals and transmitted by wireless communication unit 93, then received by wireless communication unit 52 in the lens body 20, and then converted back into original time-series command signals SB through demodulation unit 53.

Time series position signals SA are also transmitted and received between the wireless communication unit 52 and the wireless communication unit 93.

Both the wireless communication units 52 and 93 have address setting units, and communication between the wireless communication units 52 and 93 is enabled when the address values set by the respective address setting units correspond to each other.

In the fifth embodiment also, cables for connecting the lens body 20 and the signal converting unit 90 are not needed.

Therefore, changing of operation style from the tripod operation to the shoulder operation and from the shoulder operation to the tripod operation can be performed quickly by dismounting/mounting the camera body 10 and the lens body 20 that are integrally coupled from/onto a tripod. Thus, the operationality is improved.

Power supply voltage detection unit that is not shown in the drawing may be provided in the power supply unit 98, and warning may be performed when the battery voltage decreases while the apparatus is battery operated.

Specifically, a warning lamp may be caused to blink when the battery voltage starts to drop, and the warning lamp may be continuously lit when the battery voltage further decreases.

This can prevent the trouble that the operation of the lens body 20 through the demands 100, 110 is suddenly disabled while the apparatus is battery operated from occurring.

Furthermore, power source switch unit that is not shown in the drawings may be provided in the signal converting unit 90 to switch the operation power source according to a certain procedure.

In the case where the apparatus can be operated by an AC adaptor as well as the battery, power supply from the AC adaptor is given priority over the battery.

In this case, the lens body 20 can be still operated through the demands 100, 110 by using the AC adaptor even when the battery is exhausted.

According to this embodiment, since a plurality of command units is connected to the first signal converting unit having the wireless communication unit and the power supply unit, it is not necessary to provide each command unit with wireless communication unit and power supply unit.

Therefore, the configuration of the lens system can be made simple.

Furthermore, in this embodiment, the time-series command signals SB and the time-series position signals SA are modulated by the respective modulation units 51 and 92, then transmitted and received wirelessly by the wireless communication units 52 and 93, and then demodulated by the demodulation units 53 and 94.

The signal converting unit may be simplified in such a way as to perform wireless communication of the time-series command signals SB and the time-series position signals SA without performing modulation by the modulation units 51 and 92 and demodulation by the demodulation units 53 and 94.

The present invention is not limited to the above embodiments and various changes, and modifications can be made within the spirit and scope of the present invention. Therefore to apprise the public of the scope of the present invention, the following claims are made.

This application claims priority from Japanese Patent Application No. 2007-158334 filed on Jun. 15, 2007, which is hereby incorporated by reference herein.

The invention claimed is:

1. A lens apparatus comprising:
a lens body having a plurality of movable optical members;
a plurality of command units that generate a plurality of command signals for the plurality of movable optical members;
a signal converting unit that is connected with the plurality of command units by cables and wirelessly connected with the lens body; and
a communication condition monitoring unit for monitoring a wireless communication condition and a communication process switch unit for switching a communication process according to the wireless communication condition, provided in at least one of the lens body and the signal converting unit,
wherein the lens body includes: a drive control unit for detecting each position of the plurality of movable optical members, generating a plurality of position signals and driving each of the plurality of movable optical members based on the command signals and the position signals; a command signal converting unit for converting time-series command signals from the signal converting unit into a plurality of original command signals; a time-series position signal converting unit for converting the plurality of position signals of the plurality of movable optical members into time-series position signals; and a first wireless communication unit for wirelessly transmitting the time-series position signals to the signal converting unit,
wherein the signal converting unit includes: a time-series command signal converting unit for converting the plurality of command signals input from the plurality of command units into time-series command signals; a position signal converting unit for converting the time-series position signals from the lens body into the plurality of original position signals and outputting them to the plurality of command units; and a second wireless communication unit for wirelessly transmitting the time-series command signals to the lens body, and
wherein when a communication error rate, which is indicative of the communication condition and is an output of the communication condition monitoring unit, is greater than a predetermined value, the communication process switch unit causes communication to be performed only at times when a command state of the command units changes, and when the communication error rate is equal to or smaller than the predetermined value, the communication process switch unit causes communication to be performed at a regular transmitting/receiving period.

2. A lens apparatus comprising:
a lens body having a plurality of movable optical members;
a plurality of command units that generate a plurality of command signals for the plurality of movable optical members;
a signal converting unit that is connected with the plurality of command units by cables and wirelessly connected with the lens body; and
a communication condition monitoring unit for monitoring a wireless communication condition and a communication process switch unit for switching communication process according to the wireless communication condition, provided in at least one of the lens body and the signal converting unit, wherein the lens body includes: a drive control unit for detecting each position of the plurality of movable optical members, generating a plurality of position signals and driving each of the plurality of movable optical members based on the command signals and the position signals; a command signal converting unit for converting time-series command signals from the signal converting unit into a plurality of original command signals; a time-series position signal converting unit for converting the plurality of position signals of the plurality of movable optical members into time-series position signals; and a first wireless communication unit for wirelessly transmitting the time-series position signals to the signal converting unit, wherein the signal converting unit includes: a time-series command signal converting unit for converting the plurality of command signals input from the plurality of command units into time-series command signals; a position signal converting unit for converting the time-series position signals from the lens body into the plurality of original position signals and outputting them to the plurality of command units; and a second wireless communication unit for wirelessly transmitting the time-series command signals to the lens body, and wherein when a communication error rate, which is indicative of the communication condition and is an output of the communication condition monitoring unit, is equal to or smaller than a predetermined communication error rate, the communication process switch unit causes communication to be performed with time-series command signals in which the number of times of transmission is determined according to the order of priority of a function switch of the command unit.

3. A shooting apparatus comprising a lens apparatus according to claim 1 and a camera body mounted on the lens body.

4. A shooting apparatus comprising a lens apparatus according to claim 2 and a camera body mounted on the lens body.

* * * * *